United States Patent
Shoji et al.

(10) Patent No.: US 11,870,470 B2
(45) Date of Patent: Jan. 9, 2024

(54) SOFTWARE-DEFINED RADIO EQUIPMENT

(71) Applicant: HITACHI KOKUSAI ELECTRIC INC., Tokyo (JP)

(72) Inventors: Tomoya Shoji, Tokyo (JP); Michitomo Suzuki, Tokyo (JP); Nobuyuki Uchikawa, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 321 days.

(21) Appl. No.: 17/428,464

(22) PCT Filed: Feb. 27, 2019

(86) PCT No.: PCT/JP2019/007469
§ 371 (c)(1),
(2) Date: Aug. 4, 2021

(87) PCT Pub. No.: WO2020/174599
PCT Pub. Date: Sep. 3, 2020

(65) Prior Publication Data
US 2022/0109458 A1 Apr. 7, 2022

(51) Int. Cl.
*H04B 1/00* (2006.01)
*G06F 9/455* (2018.01)
*G06F 8/60* (2018.01)

(52) U.S. Cl.
CPC ........... *H04B 1/0003* (2013.01); *G06F 9/455* (2013.01); *G06F 8/60* (2013.01)

(58) Field of Classification Search
CPC ....... H04B 1/0003; H04W 88/06; H04L 67/34
See application file for complete search history.

(56) References Cited

U.S. PATENT DOCUMENTS

| | | | |
|---|---|---|---|
| 2002/0098864 A1 | 7/2002 | Mukai et al. | |
| 2013/0122819 A1* | 5/2013 | Vuyyuru | H04W 16/14 455/62 |
| 2020/0014409 A1 | 1/2020 | Shoji | |

FOREIGN PATENT DOCUMENTS

| | | |
|---|---|---|
| JP | 2001-230691 A | 8/2001 |
| JP | 2002-335186 A | 11/2002 |

(Continued)

OTHER PUBLICATIONS

International Search Report dated May 21, 2019.

*Primary Examiner* — Kevin Kim
(74) *Attorney, Agent, or Firm* — BACON & THOMAS, PLLC

(57) ABSTRACT

A software-defined radio equipment includes a hardware/module, implements radio equipment functions by downloading radio communication software that controls the hardware/module from an external source, and switches the radio communication software by using a distributed object. The software-defined radio equipment includes a first means that transmits, when a hardware to be used by the radio communication software is selected from the hardware/module, first predetermined information of the selected hardware, a second means that interrupts an execution of the radio communication software before selection when the selection is reselection and transmits second predetermined information of a selected hardware after the reselection, and a third means that transmits predetermined information of a hardware that is currently being selected. Further, if the selected hardware is the hardware that is currently being selected, an error is detected.

7 Claims, 13 Drawing Sheets

(56) References Cited

FOREIGN PATENT DOCUMENTS

| JP | 2013-246495 A | 12/2013 |
|---|---|---|
| WO | 2018/168343 A1 | 9/2018 |

\* cited by examiner

SOFTWARE-DEFINED RADIO EQUIPMENT

TECHNICAL FIELD

The present disclosure relates to a software-defined radio equipment.

BACKGROUND

With the recent expansion and growing complexity of information systems, in order to minimize system development costs and facilitate maintenance after putting a system into operation, there is a demand to implement the partitioning, distribution, and deployment of system functionality, the componentization and reuse of the functionality, and the adoption and interoperability of standardized technologies.

To this end, distributed object technology has been adopted, and, for example, Common Object Request Broker Architecture (CORBA) is widely used as the standard for distributed object technology. CORBA is the standardized technology that provides a software bus for a client to access an object on a server in a distributed environment, and its specifications are standardized by an organization for standardization called Object Management Group (OMG). In CORBA, an interface may be defined by using an interface definition language (IDL) that defines an interface that is independent of an operating system (OS), and a method present in the interface may be invoked to execute software functions of other modules. A physical connection is made through a connection medium corresponding to Internet Protocol (IP)/Internet Inter-ORB Protocol (IIOP) communication.

Meanwhile, a software-defined radio equipment is a radio equipment that may be compatible with a plurality of radio protocols by changing an execution program of the radio equipment using a software program, with hardware resources thereof remaining the same. In the software-defined radio equipment, by downloading a file defining a desired function via a network, the configuration of a module in the software-defined radio equipment may be changed, and a plurality of radio communication protocols may be implemented. As for the software-defined radio equipment, the software-defined radio equipment that implements a radio equipment by combining a plurality of software programs as parts (components) using distributed object technology has also been developed.

A radio equipment function is implemented by downloading a software program that implements functions meeting a modulation/demodulation scheme, a frequency, and its usage. Use of distributed object technology such as CORBA enables interconnection even when software programs (radio communication software) of a modem unit that modulates and demodulates, a security unit, a communication method unit (protocol unit), and a control unit are distributed and disposed in a system, and a software-defined radio equipment system as a whole may be implemented.

RELATED ART

Patent Document 1: International Patent Application Publication No. WO2018/168343

SUMMARY

The present disclosure provides a software-defined radio equipment capable of facilitating a hardware selection and a hardware reselection of radio communication software.

In view of the above, in accordance with an aspect of the present disclosure, there is provided a software-defined radio equipment that includes a hardware/module, implements radio equipment functions by downloading radio communication software that controls the hardware/module from an external source, and switches the radio communication software by using a distributed object. The software-defined radio equipment includes a first means that transmits, when a hardware to be used by the radio communication software is selected from the hardware/module, first predetermined information of the selected hardware, a second means that interrupts an execution of the radio communication software before selection when the selection is reselection and transmits second predetermined information of a selected hardware after the reselection, and a third means that transmits predetermined information of a hardware that is being currently selected. Further, if the selected hardware is the hardware that is being currently selected, an error is detected.

Effect

According to the software-defined radio equipment described above, it is possible to facilitate the hardware selection and hardware reselection of the radio communication software.

DETAILED DESCRIPTION

Figure 1:
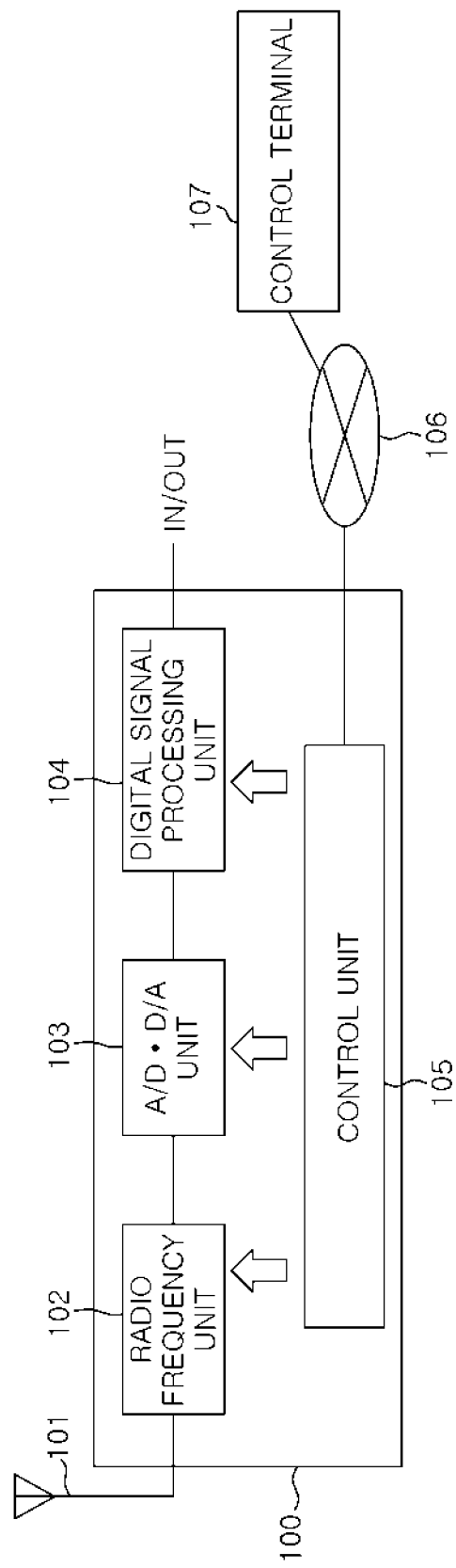
FIG. 1 illustrates a software-defined radio equipment.

Hereinafter, embodiments will be described with reference to the accompanying drawings. In the following descriptions, like reference numerals will be given to like parts having substantially the same function and configuration, and redundant description thereof will be omitted.

Software-Defined Radio Equipment

Software-defined radio technology is a radio communication technology capable of switching between radio communication protocols by changing control software without modifying a hardware itself. FIG. 1 illustrates an overview of a software-defined radio equipment 100.

The software-defined radio equipment 100 includes, as hardware modules, an antenna 101, a radio frequency unit 102, an A/D and D/A unit 103, a digital signal processing unit 104, and a control unit 105. The antenna 101 transmits and receives radio frequency signals. The radio frequency unit 102 converts a received signal in a radio frequency band received by the antenna 101 into a received signal in a low frequency band, or converts a transmission signal in a low frequency band into a transmission signal in a radio frequency band. The A/D and D/A unit 103 includes multiple channels (communication lines) with A/D converters (ADCs) and multiple channels (communication lines) with D/A converters (DACs). Each A/D converter converts a received analog signal into a digital signal and each D/A converter converts a digital signal to transmit as an analog signal. The digital signal processing unit 104 performs processing including a transmission signal encoding process and a received signal decoding process, and includes multiple channels (communication lines) with serial peripheral interfaces (SPIs) that perform the input and output of the transmission signals and the received signals. The control unit 105 includes, for example, a memory for storing software programs and a central processing unit (CPU) for executing the software programs stored in the memory. The control unit 105 is controlled by a control terminal 107 through a network 106 and controls the hardware modules of the software-defined radio equipment.

First Embodiment (Software Structure)

Figure 2:
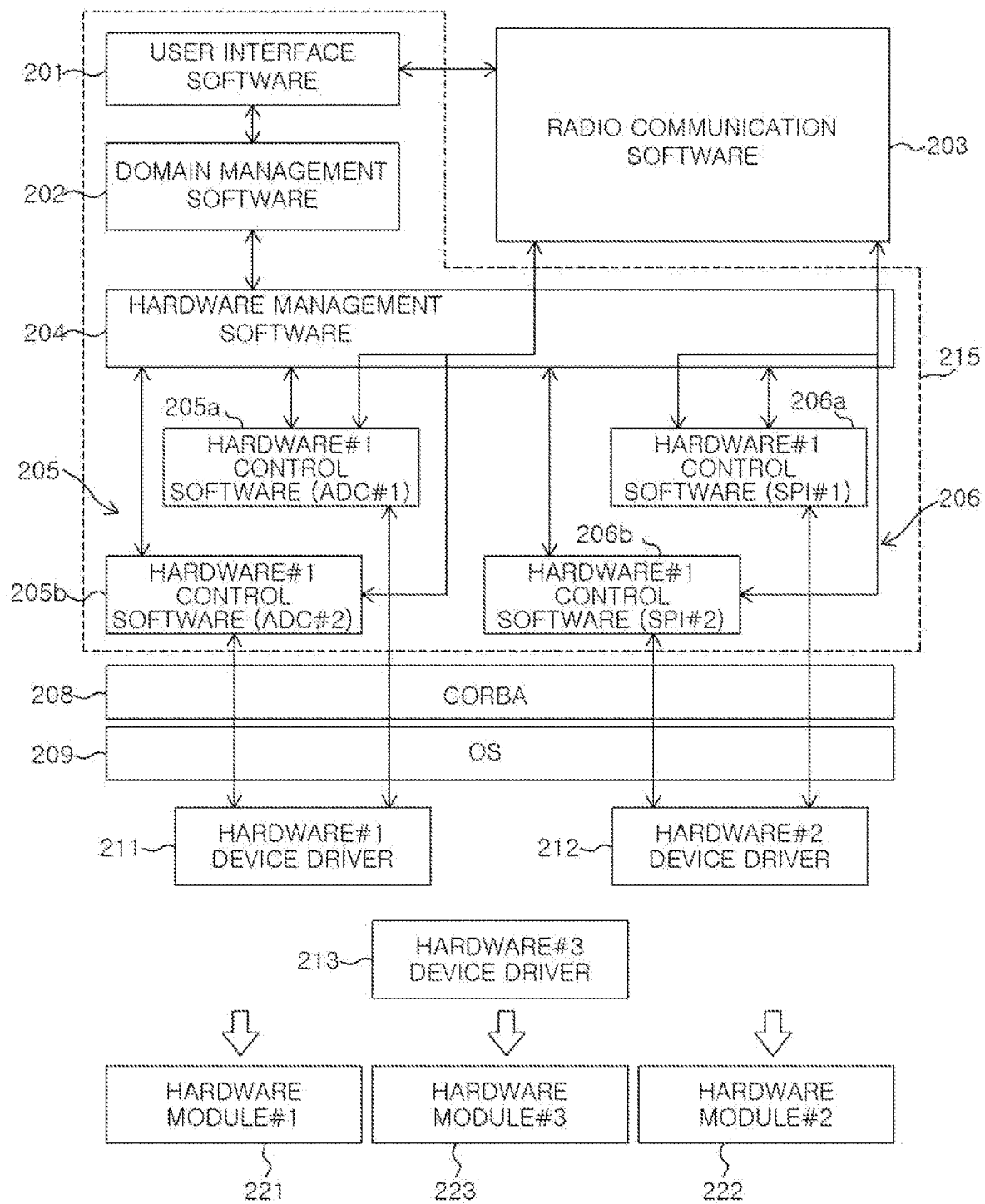
FIG. 2 illustrates a software structure of a software-defined radio equipment according to a first embodiment.

FIG. 2 illustrates a software structure of the software-defined radio equipment according to a first embodiment.

A hardware/module #1 221, a hardware/module #2 222, and a hardware/module #3 223 correspond to the A/D and D/A unit 103, the digital signal processing unit 104, and the radio frequency unit 102 of FIG. 1, respectively. A hardware #1 device driver 211, a hardware #2 device driver 212, and a hardware #3 device driver 213 drive the hardware/module #1 221, the hardware/module #2 222, and the hardware/module #3 223, respectively. The hardware #1 device driver 211, the hardware #2 device driver 212, and the hardware #3 device driver 213 operate on a predetermined operating system (OS) 209, but CORBA middleware 208 makes it possible to separate an application from the OS and hardware.

When the software-defined radio equipment 100 is powered on, the OS 209, the hardware #1 device driver 211, the hardware #2 device driver 212, the hardware #3 device driver 213, and the CORBA middleware 208 are first started. Then, environmental software 215 is started. The environmental software 215 is a software program that needs to be started at all times in order for the software-defined radio equipment 100 to operate. The environmental software 215 includes user interface software 201, domain management software 202, hardware management software 204, hardware #1 control software 205 and hardware #2 control software 206. The hardware #1 control software 205 and the hardware #2 control software 206 are installed to respectively correspond to the hardware #1 device driver 211 and the hardware #2 device driver 212, and the hardware #3 control software (not shown) is installed to correspond to the hardware #3 device driver 213. The hardware #1 control software 205, the hardware #2 control software 206, and the hardware #3 control software are higher level software programs that control the hardware #1 device driver 211, the hardware #2 device driver 212, and the hardware #3 device driver 213.

The hardware #1 control software 205 includes hardware #1 control software 205a that is control software for an ADC of a first channel (ADC #1), and hardware #2 control software 205b that is control software for an ADC of a second channel (ADC #2). The hardware #2 control software 206 includes hardware #1 control software 206a that is control software for a SPI of a first channel (SPI #1), and hardware #2 control software 206b that is control software for a SPI of a second channel (SPI #2).

In the following description, the hardware #1 control software 205 and the hardware #1 device driver 211 will be mainly described below, and the same description can be applied to the hardware #2 control software 206 and the hardware #2 device driver 212, and the hardware control #3 software (not shown) and the hardware #3 device driver 213.

As features of the software-defined radio equipment 100, radio functions such as filtering, modulation and demodulation, equalization, and synchronization functions may be programmed, and system-specific radio functions that are radio parameters such as a modulation scheme, a transmitting and receiving frequency, a bandwidth, and a transmission rate may be changed by rewriting a software program. The program that is rewritten to change these parameters is radio communication software 203. Therefore, the radio communication software 203 is mostly started based on an instruction from the user interface software 201 even though the radio communication software 203 may be started also when the software-defined radio equipment 100 is powered.

The user interface software 201 accesses and communicates with the domain management software 202 and the radio communication software 203. The domain management software 202 accesses the hardware management software 204 in addition to the user interface software 201, and the hardware management software 204 accesses the hardware #1 control software 205. The hardware #1 control software 205 accesses the radio communication software 203 and the hardware #1 device driver 211, and the radio communication software 203 accesses the user interface software 201 and the hardware #1 control software 205. Further, although it is not illustrated, the hardware management software 204 accesses the radio communication software 203 and the hardware #1 device driver 211.

(Start Sequence)

Figure 3:
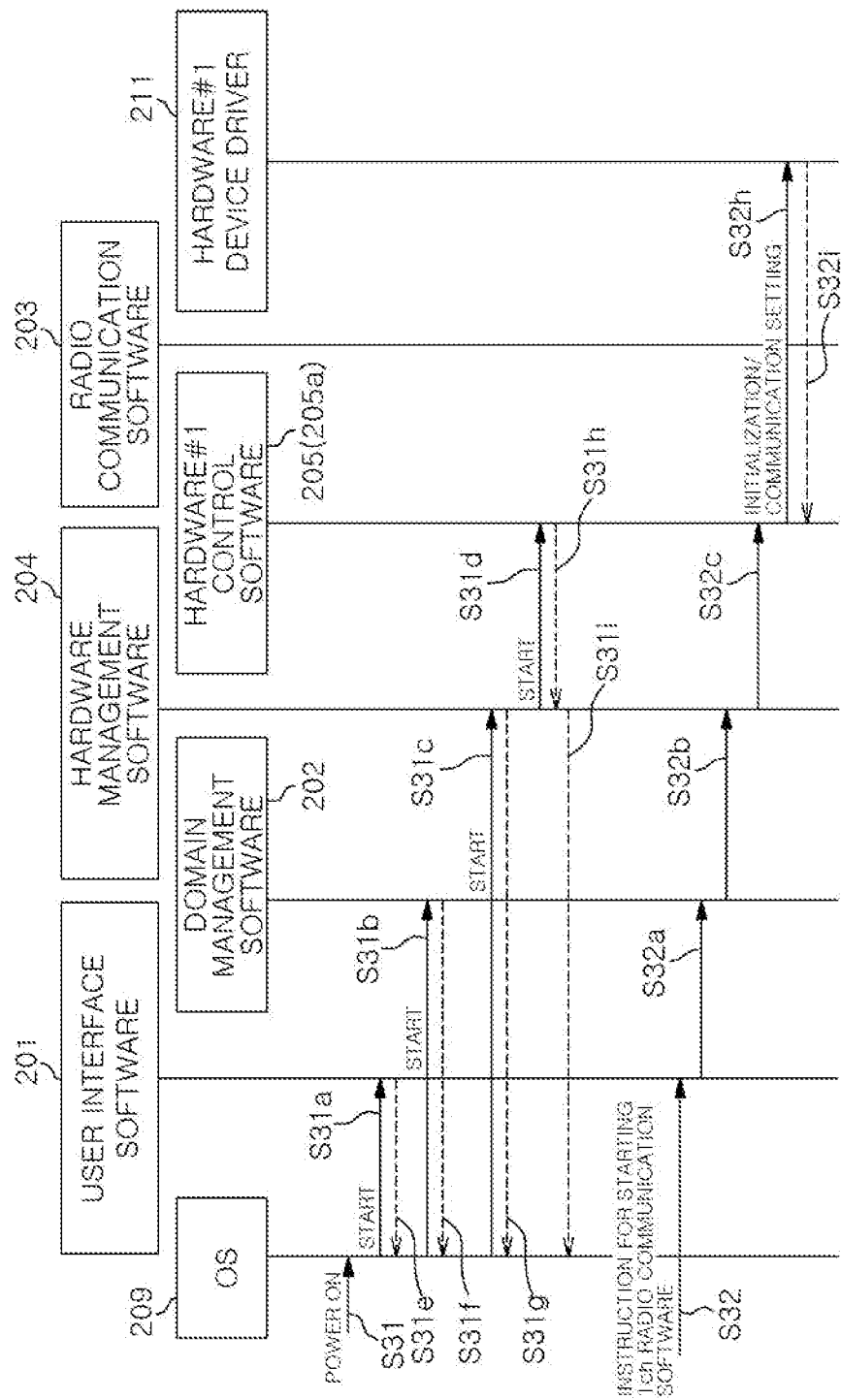
FIG. 3 illustrates a start sequence of a radio communication software shown in FIG. 2.
Figure 4:
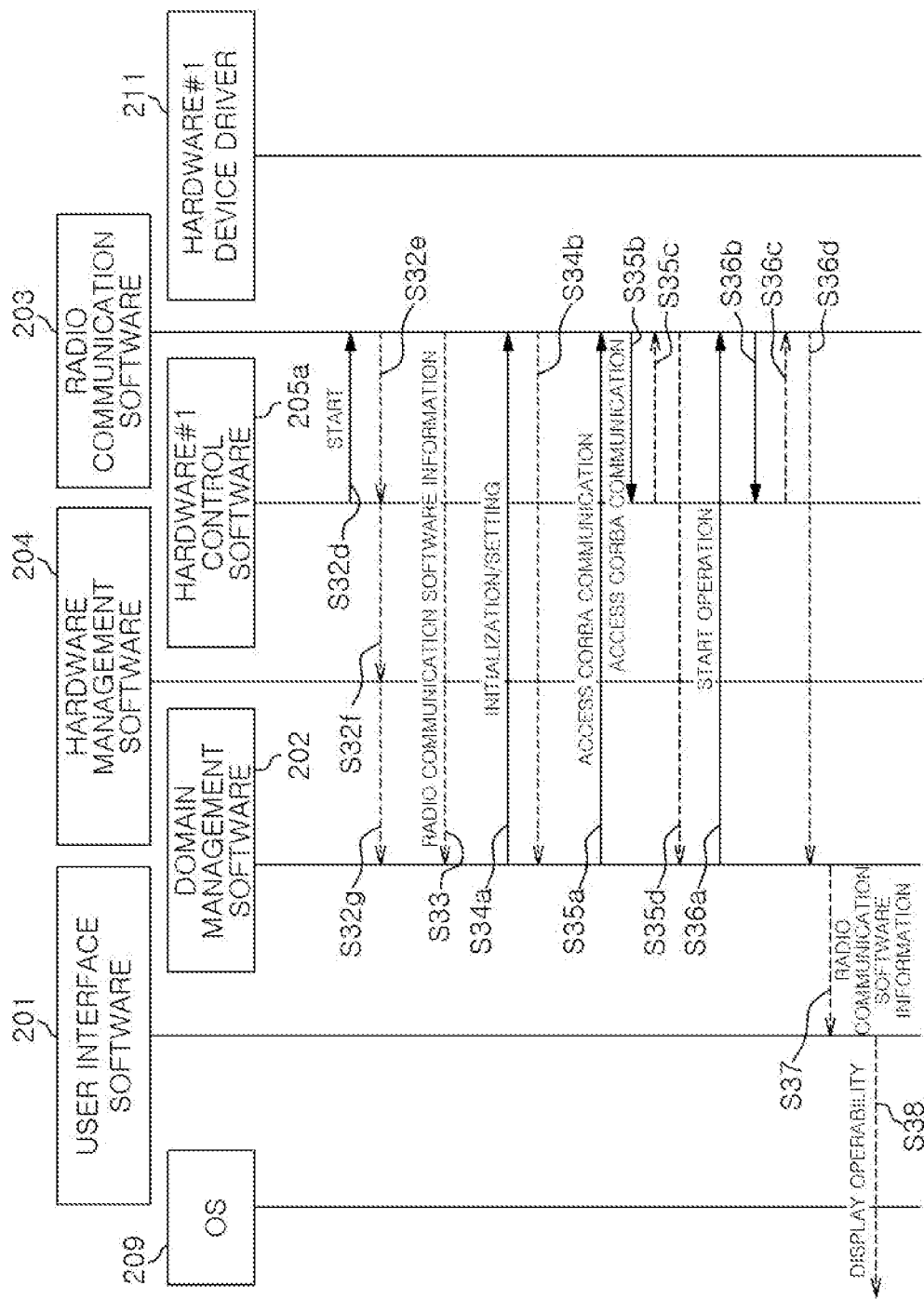
FIG. 4 illustrates the start sequence of the radio communication software shown in FIG. 2.
Figure 5:
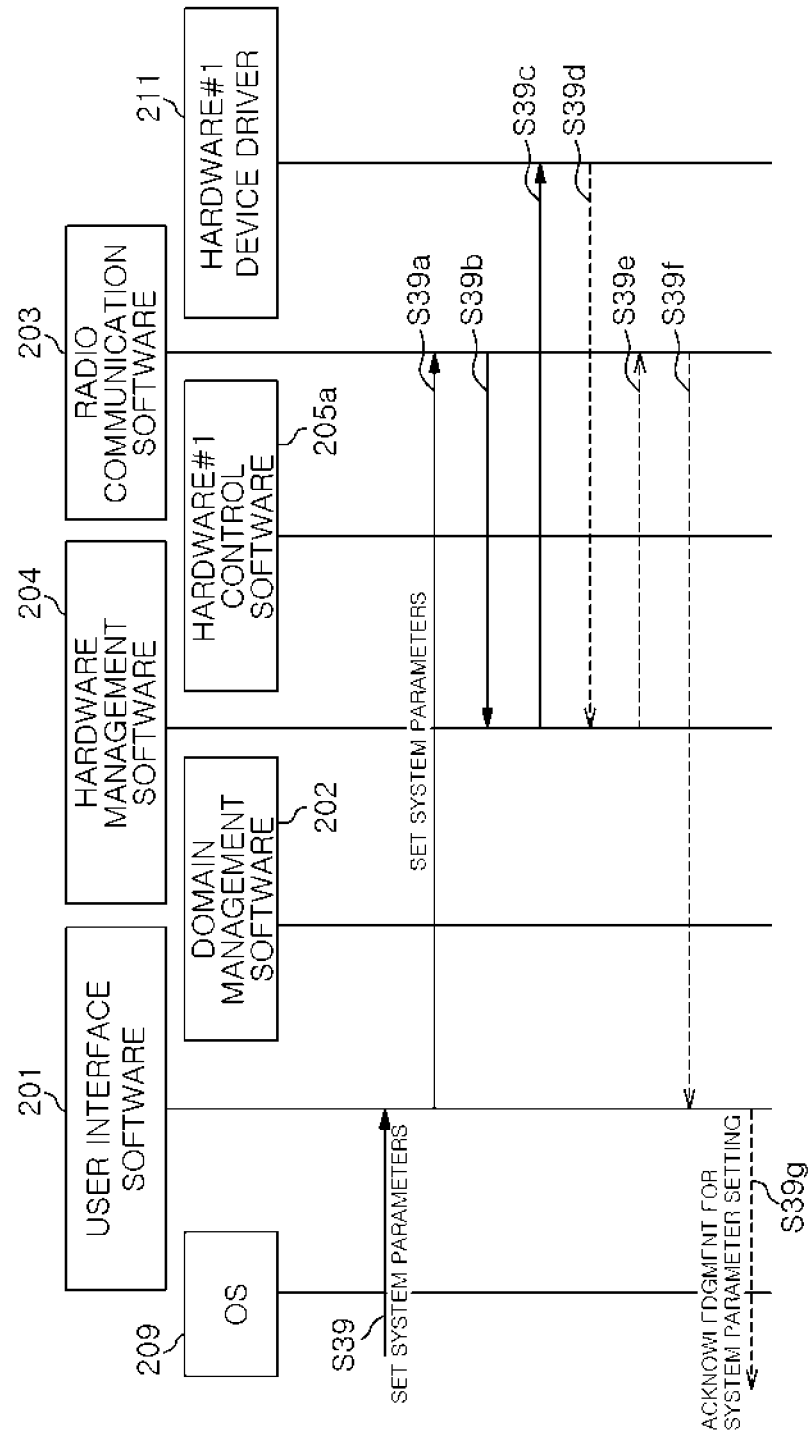
FIG. 5 illustrates the start sequence of the radio communication software shown in FIG. 2.

FIGS. 3 to 5 show a start sequence of the radio communication software 203 of the software-defined radio equipment 100 having the software structure shown in FIG. 2. The lower end step of FIG. 3 is connected to the upper end step of FIG. 4, and the lower end step of FIG. 4 is connected to the upper end step of FIG. 5.

In the following description, the hardware #1 control software 205 and the hardware #1 device driver 211 will be mainly described, and the same description can be applied to the hardware #2 control software 206 and the hardware #2 device driver 212, and the hardware #3 control software (not shown) and the hardware #3 device driver 213.

When the software-defined radio equipment 100 is powered on (step S31), the OS 209, the hardware #1 device driver 211, and the CORBA middleware 208 are first started. Then, as shown in FIG. 3, the OS 209 starts (executes) the user interface software 201, the domain management software 202, and the hardware management software 204 (steps S31a to S31c). In this case, the user interface software 201, the domain management software 202, and the hardware management software 204 transmit an acknowledgment, which indicates that the user interface software 201, the domain management software 202, and the hardware management software 204 have started, to the OS 209 (steps S31e to S31g). The hardware management software 204 starts (executes) the hardware #1 control software 205 (step S31d), and the hardware #1 control software 205 transmits an acknowledgment, which indicates that the hardware #1 control software 205 has started, to the hardware management software 204 (step S31h). In addition, the hardware management software 204 transmits an acknowledgment, which indicates that the hardware #1 control software 205 has started, to the OS 209 (step S31i). Therefore, the user interface software 201, the domain management software 202, the hardware management software 204, and the hardware #1 control software 205 are started as the environmental software 215.

Thereafter, as shown in FIG. 3, when a user gives an instruction for starting radio communication software using the ADC of the first channel (ADC #1) to the user interface software 201 (step S32), the user interface software 201 instructs the radio communication software 203 to be started through an interface defined in the domain management software 202 (step S32a).

The domain management software 202 instructs the hardware #1 control software 205a that is the control software for the ADC #1 to start the radio communication software 203 through the hardware management software 204 (steps S32b and S32c). The hardware #1 control software 205a initializes the hardware #1 device driver and sets the communication settings of the hardware #1 device driver (step S32h). The hardware #1 device driver 211 transmits an acknowledgment to the hardware #1 control software 205a (step S32i).

Next, as shown in FIG. 4, the hardware #1 control software 205a starts the radio communication software 203 (step S32d). The radio communication software 203 transmits an acknowledgment, which indicates that the radio communication software 203 has started, to the domain management software 202 through the hardware #1 control software 205a and the hardware management software 204 (steps S32e to S32g). The radio communication software 203 transmits radio communication software information to the domain management software 202 (step S33). When the radio communication software 203 is started, the radio communication software 203 operates as a CORBA servant. Thereafter, the domain management software 202 performs an initializing and/or setting process using CORBA communication with the radio communication software 203 (step S34a). The radio communication software 203 transmits an acknowledgment indicating that the initializing or setting process has been performed (step S34b). After that, a CORBA communication access process between software programs of the radio communication software 203 is performed (step S35a), and the radio communication software 203 performs the CORBA communication access process with the hardware #1 control software 205a (step S35b). Then, the hardware #1 control software 205a transmits an acknowledgment (step S35c), and the radio communication software 203 transmits an acknowledgment (step S35d).

Next, the radio communication software 203 and the user interface software 201 access each other, the domain management software 202 instructs the radio communication software 203 to start operation (step S36a), and the radio communication software 203 instructs the hardware #1 control software 205a to start operation (step S36b). Then, the hardware #1 control software 205a transmits an acknowledgment to the radio communication software 203 (step S36c), and the radio communication software 203 transmits an acknowledgment to the domain management software 202 (step S36d), thereby enabling a system operation. The domain management software 202 transmits radio communication software information to the user interface software 201 (step S37), and the user interface software 201 displays the operability and the like (step S38). The display of operability and the like includes hardware information of a currently selected communication line information and is transmitted to the user.

Next, as shown in FIG. 5, when the user gives an instruction for setting system parameters and the like to the user interface software 201 (step S39), the user interface software 201 sets the system parameters of the radio communication software 203 (step S39a). The radio communication software 203 sets the system parameters of the hardware management software 204 (step S39b), and the hardware management software 204 sets the system parameters of the hardware #1 device driver 211 (step S39c). Then, the hardware #1 device driver 211 transmits to the hardware management software 204 an acknowledgment indicating that its system parameters have been set (step S39d), the hardware management software 204 transmits to the radio communication software 203 an acknowledgment indicating that its system parameters have been set (step S39e), and the radio communication software 203 transmits to the user interface software 201 an acknowledgment indicating that its system parameters have been set (step S39f). Here, the user interface software 201 maintains the system parameters and transmits an acknowledgment indicating that the system parameters have been set (step S39g).

(Termination Sequence)

Figure 6:
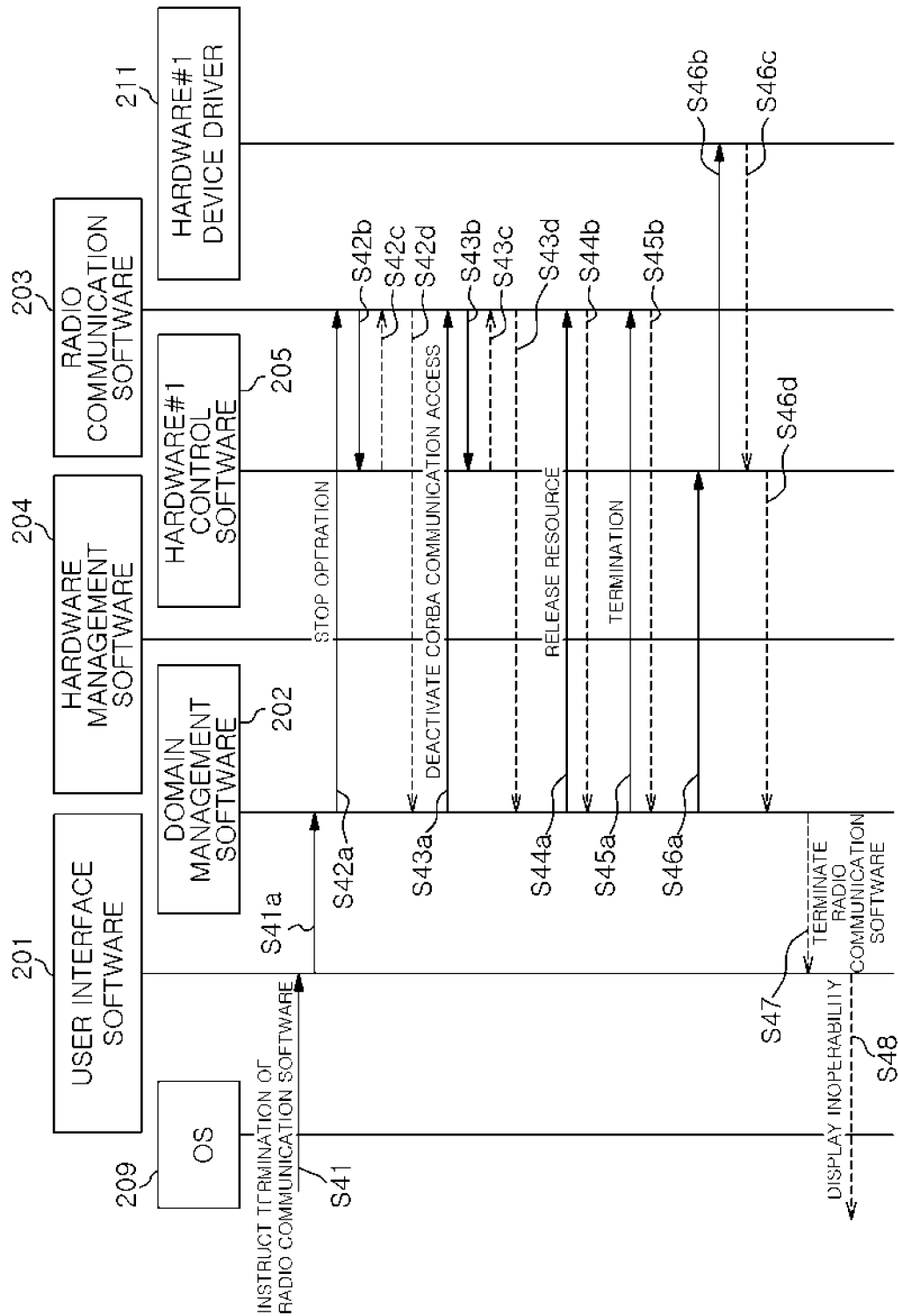
FIG. 6 illustrates a termination sequence of the radio communication software shown in FIG. 2.

FIG. 6 illustrates a termination sequence of the radio communication software 203 of the software-defined radio equipment 100 having the software structure shown in FIG. 2.

In the termination sequence, when the user gives an instruction for terminating the radio communication software to the user interface software 201 (step S41), the user interface software 201 instructs the domain management software 202 to terminate the radio communication software 203 (step S41a).

The domain management software 202 instructs the radio communication software 203 to stop operation (step S42a), and the radio communication software 203 instructs the hardware #1 control software 205 to stop operation (step S42b). Then, the hardware #1 control software 205 transmits an acknowledgement to the radio communication software 203 (step S42c) and the radio communication software 203 transmits an acknowledgement to the domain management software 202 (step S42d).

The domain management software 202 disconnects (deactivates) the CORBA communication access between itself and the radio communication software 203 (step S43a), and the radio communication software 203 disconnects (deactivates) the CORBA communication access between itself and the hardware #1 control software 205 (step S43b). Then, the hardware #1 control software 205 transmits an acknowledgement to the radio communication software 203 (step S43c), and the radio communication software 203 transmits an acknowledgement to the domain management software 202 (step S43d).

The domain management software 202 executes a release of a software object (resource) to the radio communication software 203 (step S44a), and the radio communication software 203 transmits an acknowledgement to the domain management software 202 (step S44b).

The domain management software 202 terminates the radio communication software 203 (step S45a), and the radio communication software 203 transmits an acknowledgement to the domain management software 202 (step S45b). In this case, the environmental software 215 including the hardware #1 control software 205 is not terminated, and maintains a start state without change.

The domain management software 202 instructs the hardware #1 control software 205 to close the hardware #1 device driver 211 (step S46a), and the hardware #1 control software 205 closes the hardware #1 device driver 211 (step S46b). Then, the hardware #1 device driver 211 transmits an acknowledgement to the hardware #1 control software 205 (step S46c), and the hardware #1 control software 205 transmits an acknowledgement to the domain management software 202 (step S46d).

When the domain management software 202 receives a termination response from the hardware #1 control software 205, the domain management software 202 notifies the user interface software 201 of the termination of the radio communication software (step S47), and the user interface software 201 displays inoperability and the like (step S48).

(Communication Line Change)

Figure 7:
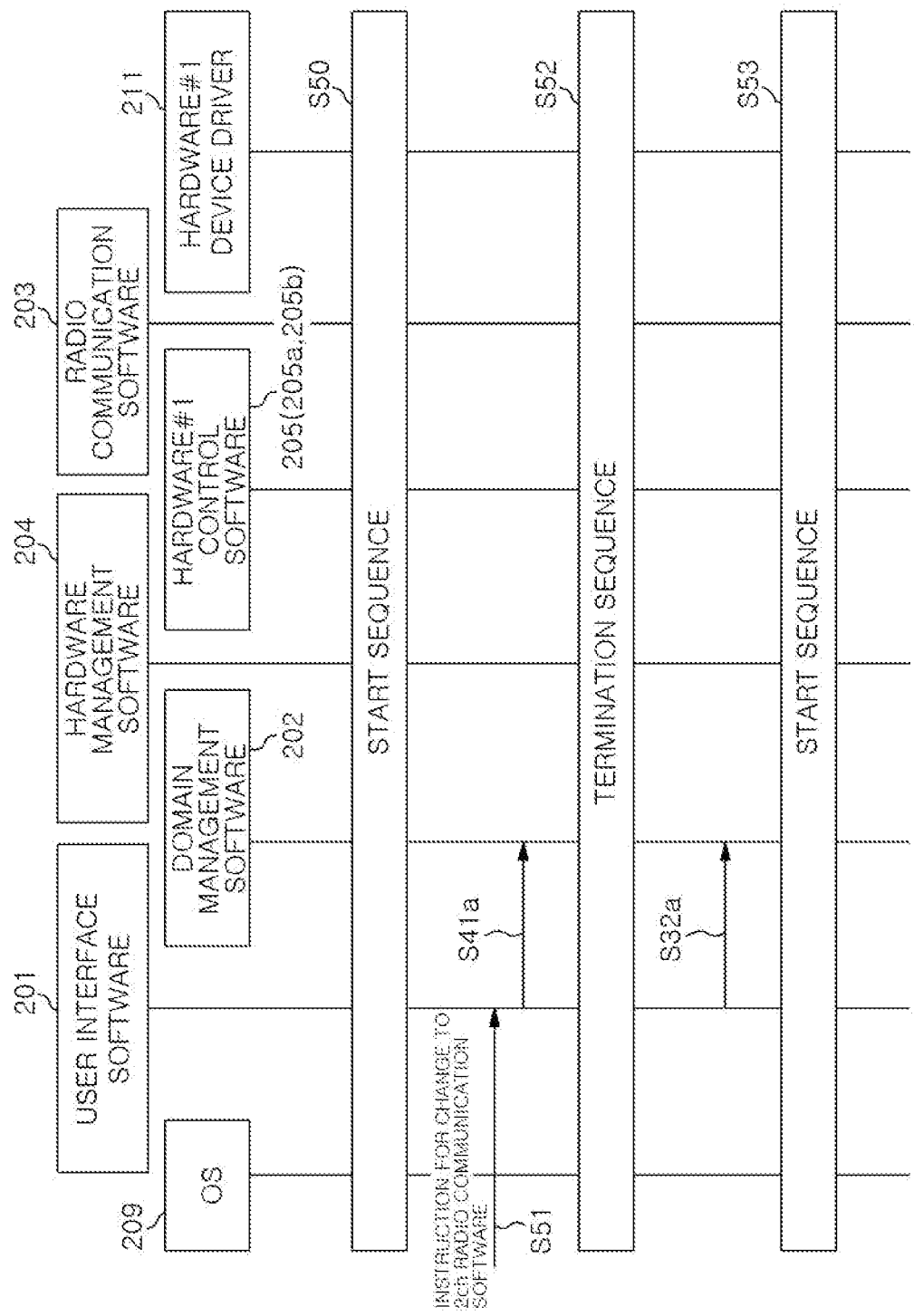
FIG. 7 illustrates a communication line change sequence of the radio communication software shown in FIG. 2.

Next, a communication line change of the radio communication software will be described. FIG. 7 illustrates a communication line change sequence of the radio communication software of the software-defined radio equipment 100 having the software structure shown in FIG. 2.

The start sequence of FIGS. 3 to 5 is performed, and the radio communication software 203 using the ADC #1 is started (step S50). In the software-defined radio equipment 100 having the software structure shown in FIG. 2, there are hardware control software such as the hardware #1 control software (ADC #1) 205a and the hardware #1 control software (ADC #2) 205b depending on the hardware in the hardware selection. Therefore, when the user gives an instruction to change the radio communication software using the ADC #1 to the radio communication software using the ADC #2 (step S51), the user interface software 201 terminates the radio communication software 203 using the ADC #1 by performing the termination sequence (steps subsequent to step S41a of the termination sequence of FIG. 6) (step S52). After that, the user interface software 201 starts (executes) the radio communication software 203 using the ADC #2 by performing the start sequence (steps S32a to S39g of the start sequence of FIGS. 3 to 5) (step S53).

According to the first embodiment, the installation of the radio communication software and the selection of the hardware can be achieved.

However, in the first embodiment, when installing the radio communication software, it is necessary to access the hardware control software according to the communication line (for example, ADC and DAC channels) when the hardware to be used is selected. Therefore, for each communication line, hardware control software or setting files are required, which leads to redundant storage use.

Further, when the hardware used with the radio communication software is reselected, it is necessary to release the currently used hardware control software and re-access the hardware control software of another communication line. Thus, the termination sequence and the start sequence are performed. As a result, the communication procedure at the time of release and re-access will be executed again, and either or both of the CPU calculation amount and the system downtime will increase.

Second Embodiment

Figure 8:
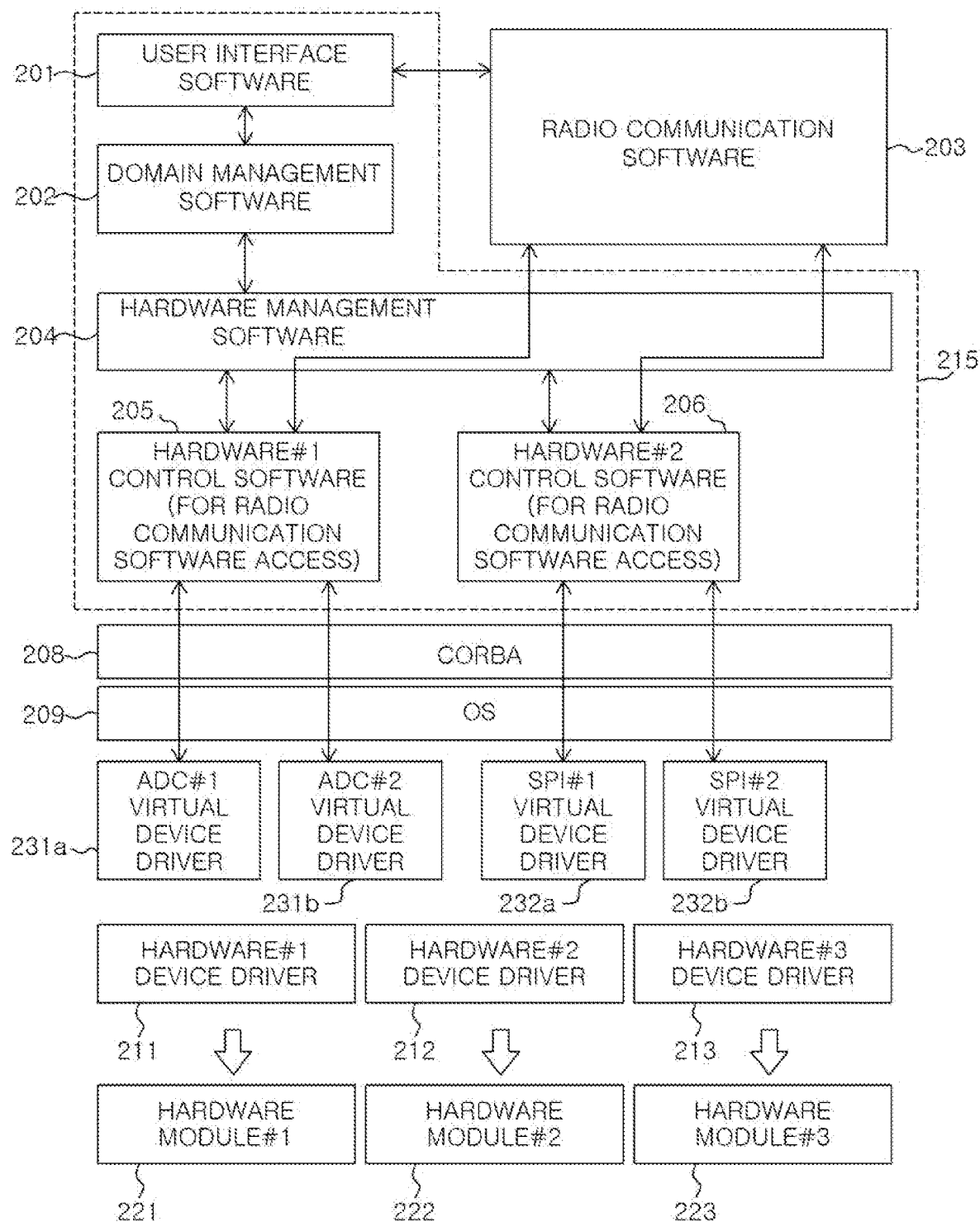
FIG. 8 illustrates a software structure of a software-defined radio equipment according to a second embodiment.

A software structure of a second embodiment that handles the above-mentioned matter that may be caused in the first embodiment will be described with reference to FIG. 8. FIG. 8 illustrates the software structure of the software-defined radio equipment 100 according to the second embodiment.

(Software Structure)

As shown in FIG. 8, in the software structure of the second embodiment, in addition to the software structure of the first embodiment, a virtual device driver 231a of the ADC #1, a virtual device driver 231b of the ADC #2, a virtual device driver 232a of the SPI #1, and a virtual device driver 232b of the SPI #2 are virtually provided on communication paths. The virtual device driver 231a of the ADC #1 and the virtual device driver 231b of the ADC #2 are provided between the hardware #1 control software 205 and the hardware #1 device driver 211 to manage the communication paths (nodes) of the hardware #1 device driver 211. Similarly, the virtual device driver 232a of the SPI #1 and the virtual device driver 232b of the SPI #2 are provided between the hardware #2 control software 206 and the hardware #2 device driver 212 to manage the communication paths (nodes) of the hardware #2 device driver 212.

Further, similar to the hardware #1 device driver 211 and the hardware #2 device driver 212, the virtual device driver 231a of the ADC #1, the virtual device driver 231b of the ADC #2, the virtual device driver 232a of the SPI #1, and the virtual device driver 232b of the SPI #2 are directly managed by the OS 209.

Although it is not illustrated, the hardware #1 control software 205 accesses and communicates with the hardware #1 device driver 211.

In the first embodiment, a plurality of hardware control software is provided for one hardware device driver. However, in the second embodiment, by providing the virtual device driver, it is possible to provide only one hardware control software for one hardware device driver.

(Start Sequence)

Figure 9:
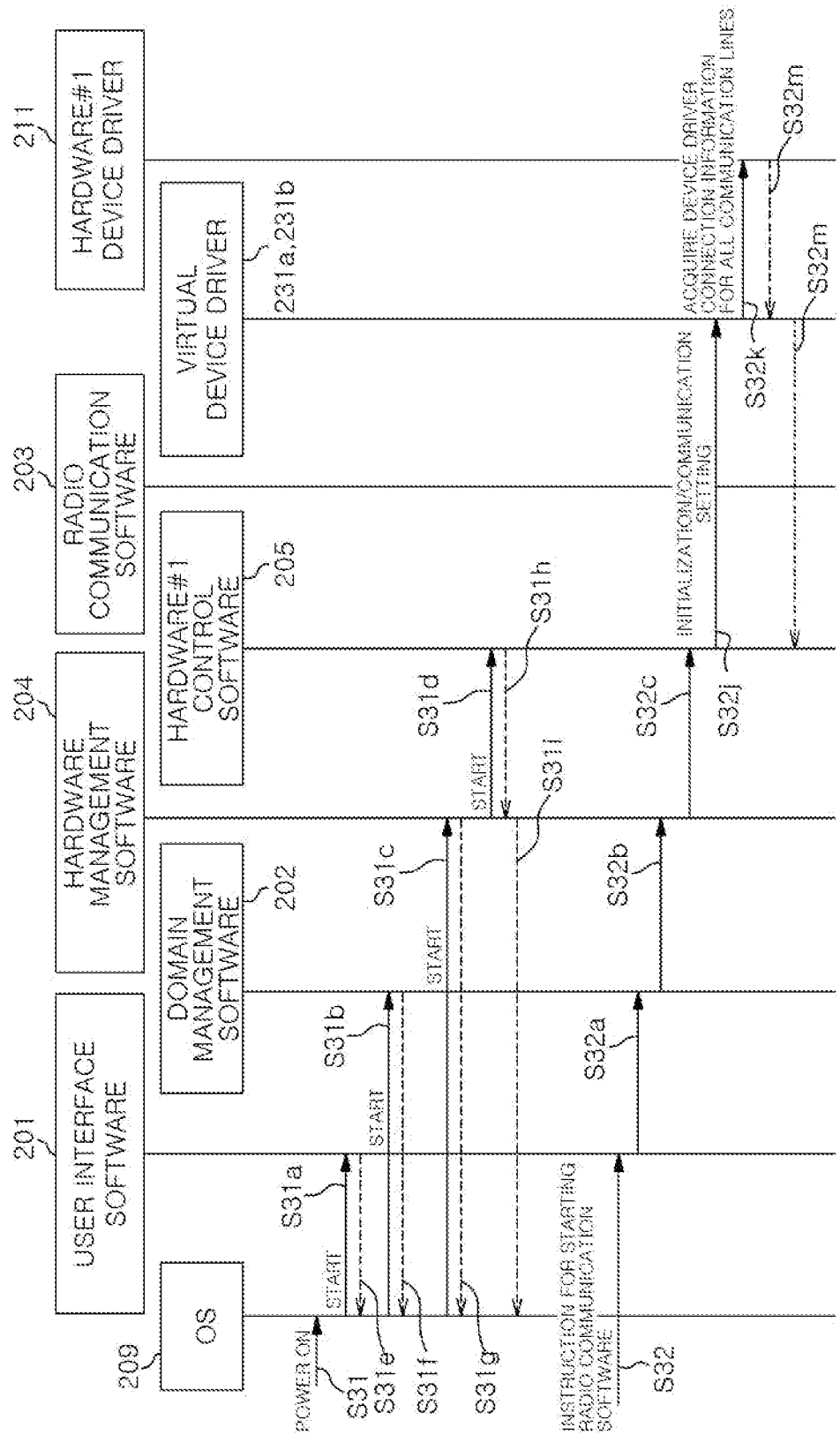
FIG. 9 illustrates a start sequence of radio communication software shown in FIG. 8.
Figure 10:
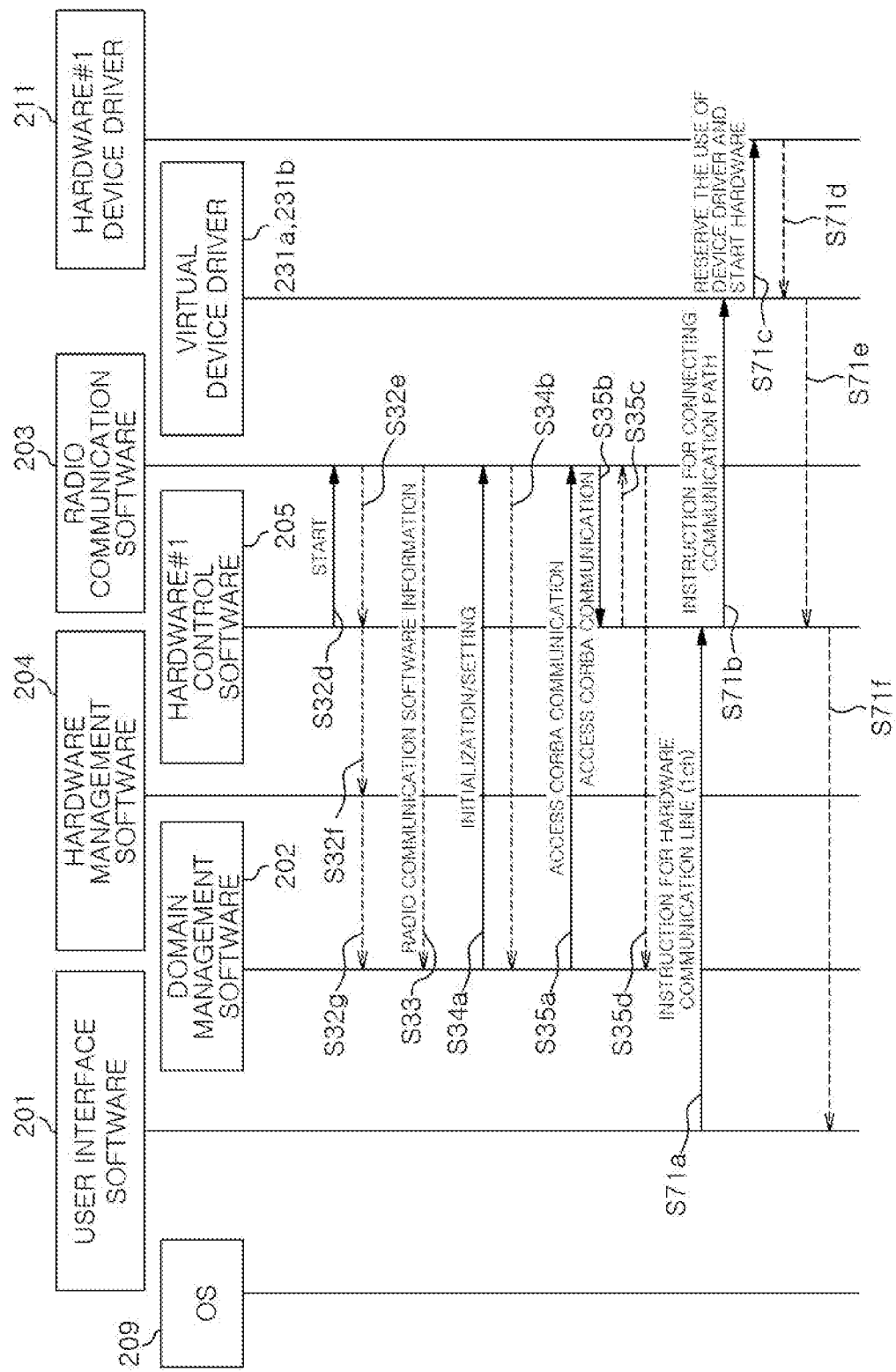
FIG. 10 illustrates the start sequence of the radio communication software shown in FIG. 8.
Figure 11:
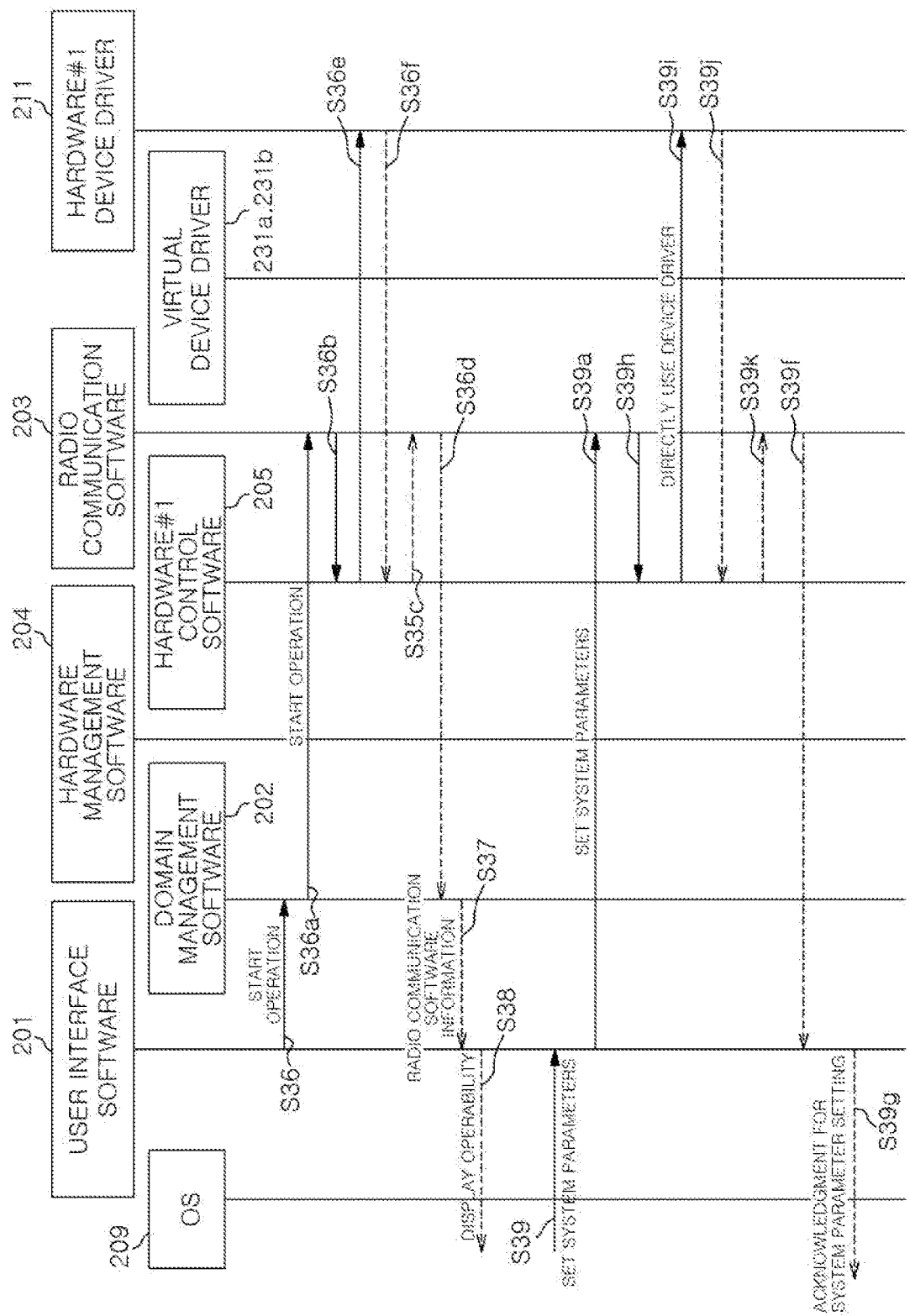
FIG. 11 illustrates the start sequence of the radio communication software shown in FIG. 8.

FIGS. 9 to 11 show a start sequence of the radio communication software 203 of the software-defined radio equipment 100 having the software structure shown in FIG. 8. The lower end step of FIG. 9 is connected to the upper end step of FIG. 10, and the lower end step of FIG. 10 is connected to the upper end step of FIG. 11.

In the following description, the hardware #1 control software 205, the virtual device drivers 231a and 231b, and the hardware #1 device driver 211 will be mainly described, and the same description can be applied to the hardware #2 control software 206, the virtual device drivers 232a and 232b, and the hardware #2 device driver 212, and the hardware #3 control software (not shown) and the hardware #3 device driver 213.

As shown in FIG. 9, steps S31 to S32c are executed in the same manner as those of the start sequence of the first embodiment, but the difference is that the hardware #1 control software 205 does not directly control the hardware #1 device driver 211 and controls the virtual device drivers 231a and 231b.

As a result of the above control, communication line information that can be handled by the virtual device drivers 231a and 231b are given to the virtual device drivers 231a and 231b.

Specifically, the hardware #1 control software 205 initializes the virtual device driver 231a of the ADC #1 and the virtual device driver 231b of the ADC #2 and sets the communication settings of the virtual device driver 231a of the ADC #1 and the virtual device driver 231b of the ADC #2 (step S32j). Then, the virtual device drivers 231a and 231b initializes the hardware #1 device driver 211 and sets the communication settings of the hardware #1 device driver 211, and the hardware #1 device driver 211 acquires device driver connection information for all communication lines (step S32k). The hardware #1 device driver 211 transmits an acknowledgment to the virtual device driver 231a (step S32m), and the virtual device driver 231a transmits an acknowledgment to the hardware #1 control software 205 (step S32n).

As shown in FIG. 10, steps S32d to S35d are executed in the same manner as those of the start sequence of the first embodiment, but before the start of the operation, the user interface software 201 transmits, for example, an instruction for connecting a hardware communication line of the first channel to the hardware #1 control software 205 (Step S71a), the hardware #1 control software 205 transmits an instruction for connecting a communication path to the virtual device driver 231a of the ADC #1 based on the communication line information (step S71b), and the virtual device driver 231a makes a reservation for the use of the first channel for the hardware #1 device driver 211 that is instructed to connect the communication path and starts (opens) the hardware (the ADC #1) of the first channel (step S71c). Then, the hardware #1 device driver 211 transmits an acknowledgement to the virtual device driver 231a of the ADC #1 (step S71d), the virtual device driver 231a of the ADC #1 transmits an acknowledgement to the hardware #1 control software 205 (step S71e), and the hardware #1 control software 205 transmits an acknowledgement to the user interface software 201 (step S71f).

Accordingly, the hardware #1 control software 205 gives an instruction for the communication path to the virtual device driver 231a of the ADC #1 while determining the communication line to be used, and the virtual device driver 231a of the ADC #1 reserves the use of the first channel for the hardware #1 device driver 211 and starts the hardware (ADC #1) of the first channel. Around this time, the hardware #1 control software 205 may receive the success or failure of the hardware reservation as a response from the hardware #1 device driver through the virtual device driver 231a of the ADC #1. If the result matches the above-mentioned communication line information, it is determined as normal, and if the result does not match the above-mentioned communication line information, it is determined as an error. Then, the determination result (the success or failure) is transmitted to the user interface software 201 as the response from the hardware #1 control software 205. That is, if the hardware #1 control software 205 erroneously makes a hardware reservation (hardware selection) for the hardware #1 device driver 211 while another hardware control software (for example, the hardware #3 control software) has already made the hardware reservation (hardware selection) for the hardware #1 device driver 211, the hardware #1 control software 205 receives a response from the hardware #1 device driver 211 that the reservation cannot be made. Then, the hardware #1 control software 205 transmits a response indicating an error to the user interface software 201.

After that, the radio communication software 203 and the user interface software 201 access each other, and as shown in FIG. 11, the user interface software 201 instructs the domain management software 202 to start operation (step S36), and the domain management software 202 instructs the radio communication software 203 to start operation (step S36a). Then, the radio communication software 203 instructs the hardware #1 control software 205 to start operation (step S36b), and the hardware #1 control software 205 instructs the hardware #1 device driver 211 to start operation (step S36e). Then, the hardware #1 device driver 211 transmits an acknowledgment to the hardware #1 control software 205 (step S36f), the hardware #1 control software 205 transmits an acknowledgment to the radio communication software 203 (step S36c), and the radio communication software 203 transmits an acknowledgment to the domain management software 202 (step S36d), thereby enabling a system operation. The domain management software 202 transmits the radio communication software information to the user interface software 201 (step S37), and the user interface software 201 displays the operability and the like (step S38). The operability display includes the hardware information of the currently selected communication line information and is transmitted to the user.

Next, when the user gives an instruction for setting system parameters and the like to the user interface software 201 (step S39), the user interface software 201 sets the system parameters of the radio communication software 203 (step S39a). The radio communication software 203 sets the system parameters of the hardware #1 control software 205 (step S39h), and the hardware #1 control software 205 sets (directly) the system parameters of the hardware #1 device driver 211, based on the reserved information in step S71c, without using the virtual device driver (step S39i). Then, the hardware #1 device driver 211 transmits to the hardware #1 control software 205 an acknowledgment indicating that its system parameters and the like have been set (step S39j), the hardware #1 control software 205 transmits to the radio communication software 203 an acknowledgment indicating that its system parameters and the like have been set (step S39k), and the radio communication software 203 transmits to the user interface software 201 an acknowledgment indicating that its system parameters have been set (step S39f). Here, the user interface software 201 maintains the system parameters and transmits an acknowledgment indicating that the system parameters have been set (step S39g).

(Communication Line Change)

Figure 12:
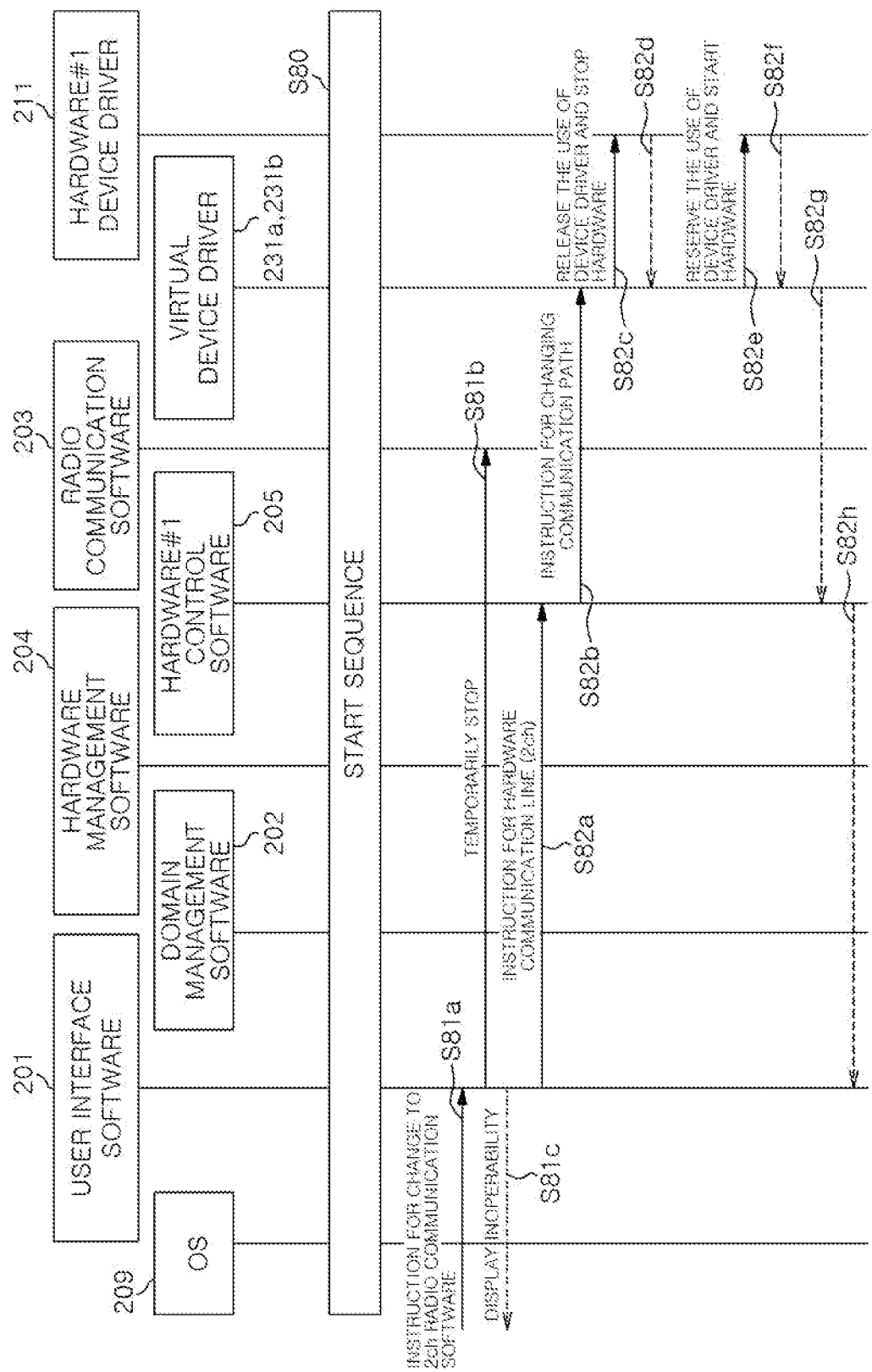
FIG. 12 illustrates a communication line change sequence of the radio communication software shown in FIG. 8.
Figure 13:
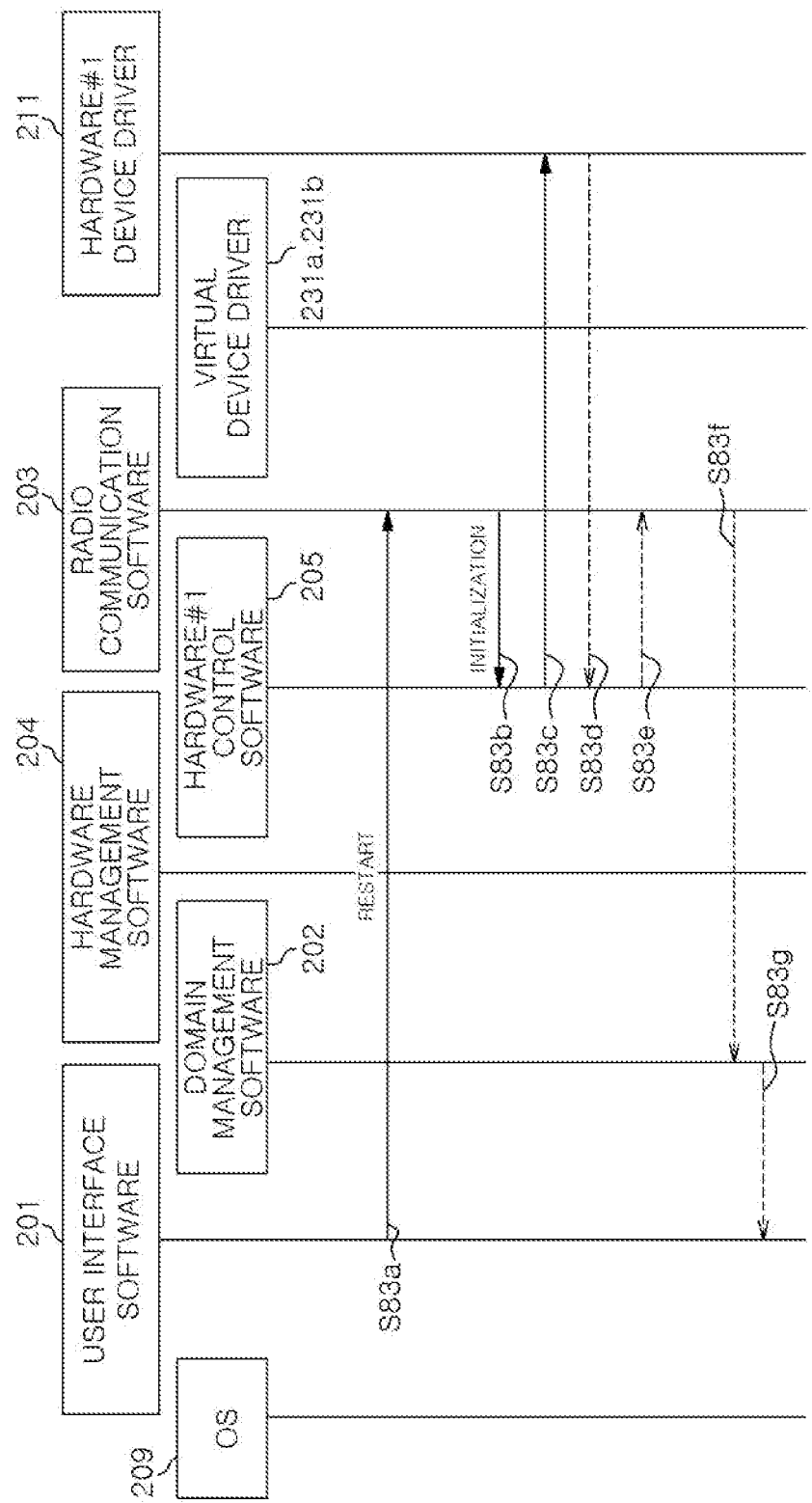
FIG. 13 illustrates the communication line change sequence of the radio communication software shown in FIG. 8.

Next, the change of the communication line of the radio communication software will be described. FIGS. 12 and 13 show a sequence of changing a communication line of the radio communication software of the software-defined radio equipment 100 having the software structure shown in FIG. 8.

As shown in FIG. 12, the second embodiment is different from the first embodiment, and the instruction for changing the hardware communication line is given to the hardware #1 control software 205 while temporarily stopping (temporarily interrupting) the radio communication software 203. Upon receiving the instruction, the hardware #1 control software 205 instructs the virtual device drivers 231a and 231b to change the hardware system, stops the hardware (ADC #1), and releases the hardware #1 device driver 211 from the channel. After that, the use of the second channel that is another communication line for the hardware #1 device driver is reserved in the same manner as the start of the first channel, and the hardware (ADC #2) is started.

Specifically, the start sequence of FIGS. 9 to 11 is performed, and the radio communication software 203 of the first channel is started (step S80). The user instructs the user interface software 201 to change the radio communication software 203 of the first channel to the radio communication software 203 of the second channel (step S81*a*), and the user interface software 201 instructs the radio communication software 203 to be temporarily stopped due to the change of the communication line (step S81*b*). Then, the user interface software 201 displays the inoperability and the like (step S81*c*). The user interface software 201 instructs the hardware #1 control software 205 to change the hardware communication line from the first channel to the second channel (step S82*a*), and the hardware #1 control software 205 instructs the virtual device drivers 231*a* and 231*b* to change the communication path based on the communication line information (step S82*b*). The virtual device driver 231*a* of the ADC #1 releases the use of the first channel for the hardware #1 device driver 211 and stops (closes) the hardware (ADC #1) of the first channel (step S82*c*). Then, the hardware #1 device driver 211 transmits an acknowledgment to the virtual device drivers 231*a* and 231*b* (step S82*d*). The virtual device driver 231*b* of the ADC #2 reserves the use of the second channel for the hardware #1 device driver 211 and starts (opens) the hardware (ADC #2) of the second channel (step S82*e*). Then, the hardware #1 device driver 211 transmits an acknowledgment to the virtual device drivers 231*a* and 231*b* (step S82*f*), and the virtual device drivers 231*a* and 231*b* transmit an acknowledgment to the hardware #1 control software 205 (step S82*g*).

Thereafter, as shown in FIG. 13, the user interface software 201 instructs the radio communication software 203 to restart after the communication line is changed, and the radio communication software 203 performs the initializing for each communication line. This operation is considerably faster than the terminating and restarting operation of the first embodiment, and it is possible to shorten the system downtime.

Specifically, the user interface software 201 instructs the radio communication software 203 to restart after the communication line is changed and to change the communication path based on the communication line information (step S83*a*). The radio communication software 203 performs the initializing of the hardware #1 control software 205 when the communication line is changed (step S83*b*), and the hardware #1 control software 205 performs the initializing of the hardware #1 device driver 211 (step S83*c*). Then, the hardware #1 device driver 211 transmits an acknowledgment to the hardware #1 control software 205 (step S83*d*), the hardware #1 control software 205 transmits an acknowledgment to the radio communication software 203 (step S83*f*), and the radio communication software 203 transmits an acknowledgment to the user interface software 201 through the domain management software 202 (steps S83*f* and S83*g*).

Thereafter, steps that are the same as steps S37 to S39*g* of the first embodiment are performed.

The termination sequence is performed in the same manner as steps S41 to S46*a* and S46*d* to S48 of the first embodiment. Further, instead of steps 46*b* and S46*c*, the hardware #1 control software 205 closes the hardware #1 device driver 211 through the virtual device driver 231*a*, and the hardware #1 device driver 211 transmits an acknowledgement to the hardware #1 control software 205 through the virtual device driver 231*a*.

As described above, the software-defined radio equipment of the second embodiment has the following functions:
(A) a function of partitioning the interface for each hardware information (communication line),
(B) a function of transmitting information (communication line) of the selected hardware to the hardware control software,
(C) a function of transmitting the instruction for temporarily stopping the execution to the radio communication software when the user instructs the reselection of the hardware, and transmitting the hardware information (communication line) after reselection to the hardware control software,
(D) a function of transmitting information of a hardware currently being selected to the user, and
(E) a function of detecting an error when the hardware that is being selected by another hardware control software is erroneously selected.

By transmitting the hardware information using the function (B), it is possible to select the hardware with the optimum resources without generating a plurality of hardware control software and a plurality of setting information suitable for the hardware. Further, only the temporarily stopping (temporarily interrupting) of the radio communication software using the function (C) is performed, so that it is possible to reduce the downtime and the processing in the hardware reselection as compared with the first embodiment.

In other words, according to the second embodiment, even in the case where a plurality of radio communication software are started, the radio communication software performs the communication line change without changing the connection of the hardware control software necessary for communication with the hardware, the resources related to connection information can be suppressed, and the system downtime can be shortened.

The invention made by the present inventors has been specifically described above based on the embodiments, but the invention should not be limited to the embodiments, and various modifications may be made to the invention.

EXPLANATION OF REFERENCE NUMERALS

100: software-defined radio equipment
101: antenna
102: radio frequency unit
103: A/D and D/A unit
104: digital signal processing unit
105: control unit
106: network
107: control terminal
201: user interface software
202: domain management software
203: radio communication software
204: hardware management software
205: hardware #1 control software
206: hardware #2 control software
208: CORBA
209: OS
215: environmental software
231*a*: virtual device driver of ADC #1
231*b*: virtual device driver of ADC #2
232*a*: virtual device driver of SPI #1
232*b*: virtual device driver of SPI #2

The invention claimed is:
1. A software-defined radio equipment that includes a hardware/module, implements radio equipment functions by downloading radio communication software that controls the hardware/module from an external source, and switches the radio communication software by using a distributed object, the software-defined radio equipment comprising:

a first means that transmits, when a hardware to be used by the radio communication software is selected from the hardware/module, first predetermined information of the selected hardware;

a second means that interrupts an execution of the radio communication software before selection when the selection is reselection and transmits second predetermined information of a selected hardware after the reselection; and a third means that transmits predetermined information of a hardware that is currently being selected, wherein if the selected hardware is the hardware that is currently being selected, an error is detected.

2. The software-defined radio equipment of claim 1, further comprising:

a hardware device driver that drives the hardware/module; and a virtual device driver that is virtually placed on a communication path and selects the communication path.

3. The software-defined radio equipment of claim 2, wherein environmental software that is started when the software-defined radio equipment is started includes user interface software, domain management software, hardware management software, and hardware control software, and the virtual device driver is provided between the hardware control software and the hardware device driver and manages the communication path of the hardware device driver.

4. The software-defined radio equipment of claim 3, wherein a start sequence at power-on includes the first means, and the first means includes:

a process in which the user interface software transmits an instruction for the first predetermined information to the hardware control software, a process in which the hardware control software transmits an instruction for the communication path to the virtual device driver based on the first predetermined information, and a process in which the virtual device driver transmits a reservation for hardware use to the hardware device driver based on the communication path and starts the hardware.

5. The software-defined radio equipment of claim 4, wherein a communication line change sequence includes the second means, and the second means includes:

a process in which the user interface software temporarily stops the radio communication software, a process in which the user interface software transmits an instruction for the second predetermined information to the hardware control software, a process in which the hardware control software transmits an instruction for changing the communication path to the virtual device driver based on the second predetermined information, and a process in which the virtual device driver releases a hardware device driver of the previous communication path, stops the hardware of the previous communication path, transmits a reservation for hardware use to a hardware device driver of the changed communication path, and starts another hardware.

6. The software-defined radio equipment of claim 4, wherein the start sequence at power-on further includes:

a process in which the user interface software transmits an instruction for starting the radio communication software to the hardware control software, a process in which the hardware control software initializes the virtual device driver and sets communication settings of the virtual device driver, a process in which the virtual device driver sets connection information for all communication lines of the hardware device driver, a process in which the hardware control software transmits an instruction for starting the radio communication software, a process in which the domain management software initializes the radio communication software and sets communication settings of the radio communication software, and CORBA communication access between software programs of the radio communication software is performed, a process in which the user interface software transmits an instruction for starting operation to the radio communication software, a process in which the user interface software sets system parameters of the radio communication software, and a process in which the hardware control software sets system parameters of the reserved hardware device driver.

7. The software-defined radio equipment of claim 5, wherein the communication line change sequence further includes:

a process in which the user interface software transmits an instruction for restart to the radio communication software, and a process in which the radio communication software initializes the hardware control software.

* * * * *